(12) United States Patent
Stieff et al.

(10) Patent No.: US 8,033,028 B2
(45) Date of Patent: Oct. 11, 2011

(54) METHOD AND APPARATUS FOR VEHICLE SERVICE SYSTEM OPTICAL TARGET ASSEMBLY

(75) Inventors: Michael T. Stieff, Wentzville, MO (US); Daniel R. Dorrance, Ballwin, MO (US); Thomas J. Golab, St. Peters, MO (US); Mark S. Shylanski, University City, MO (US)

(73) Assignee: Hunter Engineering Company, Bridgeton, MO (US)

( * ) Notice: Subject to any disclaimer, the term of this patent is extended or adjusted under 35 U.S.C. 154(b) by 0 days.

(21) Appl. No.: 13/071,172

(22) Filed: Mar. 24, 2011

(65) Prior Publication Data
US 2011/0170089 A1    Jul. 14, 2011

Related U.S. Application Data

(63) Continuation of application No. 12/720,453, filed on Mar. 9, 2010, now Pat. No. 7,930,834, which is a continuation of application No. 12/172,554, filed on Jul. 14, 2008, now Pat. No. 7,703,212, which is a continuation of application No. 11/535,881, filed on Sep. 27, 2006, now Pat. No. 7,444,752.

(60) Provisional application No. 60/721,206, filed on Sep. 28, 2005.

(51) Int. Cl.
  *G01B 11/275* (2006.01)
  *G01B 5/255* (2006.01)
(52) U.S. Cl. .................. 33/203.18; 33/288; 356/139.09
(58) Field of Classification Search ............... 33/203, 33/203.18, 203.19, 203.2, 288; 356/139.09, 356/155, 620
See application file for complete search history.

(56) References Cited

U.S. PATENT DOCUMENTS 3,409,991 A * 11/1968 Davis et al. .................. 33/335
3,426,991 A *  2/1969 Rishovd ..................... 248/205.1
(Continued)

FOREIGN PATENT DOCUMENTS

DE    102008042024 A1 *  3/2010
(Continued)

OTHER PUBLICATIONS

Hartley et al., "Multiple View Geometry in Computer Vision, Second Edition", Cambridge University Press, Third Printing, 2006. Selected pages, including cover page, title page, table of contents, and Chapter 7, consisting of pp. 178-194. (26 Pages Total).

(Continued)

*Primary Examiner* — R. A. Smith
(74) *Attorney, Agent, or Firm* — Polster, Lieder, Woodruff & Lucchesi, L.C.

(57) ABSTRACT

A method and apparatus for determining the alignment of a vehicle wheel using an optical target attached to the vehicle wheel, the optical target having a dimensionally stable shape and a plurality of visible features defining target elements arranged in a known geometric and spatial configuration relative to each other across at least two surfaces. A two-dimensional image of the optical target is acquired by an imaging system to detect a plurality of target element images corresponding to the plurality of target elements. A spatial orientation of the optical target and an alignment of the vehicle wheel is then determined from the plurality of target element images and the known geometric and spatial configuration of the plurality of target elements on the target surfaces.

19 Claims, 9 Drawing Sheets

U.S. PATENT DOCUMENTS

| | | | | |
|---|---|---|---|---|
| 4,097,157 | A * | 6/1978 | Lill | 356/139.09 |
| 4,265,537 | A * | 5/1981 | Hunter | 356/155 |
| 4,303,338 | A * | 12/1981 | Morrison et al. | 356/155 |
| 4,573,275 | A * | 3/1986 | Bremer | 33/288 |
| 4,827,623 | A * | 5/1989 | Goodell | 33/288 |
| 4,854,702 | A * | 8/1989 | Stieff | 356/155 |
| 5,048,192 | A * | 9/1991 | Pascoal | 33/203.18 |
| 5,301,435 | A * | 4/1994 | Buckley | 33/293 |
| 5,535,522 | A | 7/1996 | Jackson | |
| 5,724,743 | A * | 3/1998 | Jackson | 33/288 |
| 5,886,781 | A * | 3/1999 | Muller et al. | 356/139.09 |
| 5,969,246 | A * | 10/1999 | Jackson et al. | 73/459 |
| 5,987,761 | A * | 11/1999 | Ohnesorge | 33/203.18 |
| 6,128,585 | A * | 10/2000 | Greer | 702/104 |
| 6,148,528 | A | 11/2000 | Jackson | |
| 6,282,799 | B1 * | 9/2001 | Warkotsch | 33/203.18 |
| 6,370,455 | B1 | 4/2002 | Larson et al. | |
| 6,483,577 | B2 | 11/2002 | Stieff | |
| 6,522,400 | B1 * | 2/2003 | Horn | 356/155 |
| 6,526,665 | B2 | 3/2003 | Jackson | |
| 6,600,555 | B2 | 7/2003 | McClenahan | |
| 6,697,761 | B2 | 2/2004 | Akatsuka et al. | |
| 6,813,015 | B2 * | 11/2004 | Knoedler et al. | 356/155 |
| 6,894,771 | B1 | 5/2005 | Dorrance et al. | |
| 6,901,673 | B1 * | 6/2005 | Cobb et al. | 33/502 |
| 6,973,202 | B2 | 12/2005 | Mostafavi | |
| 6,990,215 | B1 * | 1/2006 | Brown et al. | 382/106 |
| 7,444,752 | B2 * | 11/2008 | Stieff et al. | 33/203.18 |
| 7,703,212 | B2 * | 4/2010 | Stieff et al. | 33/203.18 |
| 7,869,026 | B2 * | 1/2011 | Boyer et al. | 356/243.1 |
| 7,930,834 | B2 * | 4/2011 | Stieff et al. | 33/203.18 |
| 2002/0092183 | A1 * | 7/2002 | Jackson | 33/203.18 |
| 2003/0063292 | A1 | 4/2003 | Mostafavi | |
| 2003/0090682 | A1 * | 5/2003 | Gooch et al. | 356/620 |
| 2003/0187610 | A1 | 10/2003 | Dorrance et al. | |
| 2006/0090356 | A1 | 5/2006 | Stieff | |
| 2006/0152711 | A1 | 7/2006 | Dale et al. | |
| 2006/0274302 | A1 * | 12/2006 | Shylanski et al. | 356/139.09 |
| 2008/0289202 | A1 | 11/2008 | Kassouf et al. | |
| 2011/0001821 | A1 * | 1/2011 | Stieff et al. | 348/135 |
| 2011/0051151 | A1 * | 3/2011 | Dorrance et al. | 356/620 |

FOREIGN PATENT DOCUMENTS

| | | | | |
|---|---|---|---|---|
| EP | 1422496 | A1 | * | 5/2004 |
| JP | 2002090118 | A | * | 3/2002 |
| JP | 2003296708 | A | * | 10/2003 |
| WO | WO 9923464 | A1 | * | 5/1999 |
| WO | WO 0033018 | A1 | * | 6/2000 |
| WO | WO 2007124010 | A2 | * | 11/2007 |

OTHER PUBLICATIONS

Oliver Faugeras, "Three-Dimensional Computer Vision—A Geometric Viewpoint", The MIT Press, Cambridge, Massachusetts, Third Printing, 1999. Selected pages, including cover page, title page, table of contents, and pp. 230-240. (19 Pages Total).

* cited by examiner

METHOD AND APPARATUS FOR VEHICLE SERVICE SYSTEM OPTICAL TARGET ASSEMBLY

CROSS-REFERENCE TO RELATED APPLICATIONS

The present application is a continuation of, and claims priority to, U.S. patent application Ser. No. 12/720,453 filed on Mar. 9, 2010, which in turn is a continuation of U.S. patent application Ser. No. 12/172,554 filed on Jul. 14, 2008, now U.S. Pat. No. 7,703,312, which in turn is a continuation of U.S. patent application Ser. No. 11/535,881 filed on Sep. 27, 2006, now U.S. Pat. No. 7,444,752, which in turn is related to, and claims priority from, U.S. Provisional Patent Application Ser. No. 60/721,206 filed on Sep. 28, 2005, each of the aforementioned applications and patents are herein incorporated by reference.

STATEMENT REGARDING FEDERALLY SPONSORED RESEARCH

Not Applicable.

BACKGROUND OF THE INVENTION

The present invention relates to machine vision vehicle service systems, and in particular to an optical target assembly configured for mounting to a surface of a vehicle, such as a vehicle wheel, during a machine-vision vehicle wheel alignment procedure.

A machine-vision vehicle service system, such as a vehicle wheel alignment system like the Series 811 Wheel Alignment System utilizing the DSP 600 Series sensors, manufactured and sold by Hunter Engineering Company of Bridgeton, Mo., consists generally of a console having a computer or processing unit, one or more display devices such as a monitor, and one or more input devices such as a keyboard. In a machine-vision vehicle wheel alignment system, one or more imaging sensor arrays are mounted away from a vehicle undergoing an alignment inspection, and are configured to obtain images of alignment targets or other identifiable features associated with the vehicle for communication to the processing unit. Correspondingly, the processing unit is configured with one or more software applications, at least one of which is adapted to facilitate the alignment of vehicle wheels which generally consist of a rim and an associated tire, using input received from the imaging sensors.

The machine-vision imaging sensors are traditionally part of a camera system or imaging system configured to view optical targets within associated fields of view to obtain images thereof for processing by the software applications in the console. Commonly, the observed optical targets incorporate highly accurate patterns that have known control features. The positions and relationships of the features in the images are determined, and the orientation of the wheels or other vehicle components to which the optical targets are attached are calculated by well known algorithms. Exemplary configurations for the high-accuracy optical targets are described in U.S. Pat. No. 6,064,750 to January, and in U.S. Pat. No. 6,134,792 to January. Each optical target consists of a target face, on which are disposed identifiable optical elements, a precision flat base, and a mounting shaft adapted for attachment to a separate clamping assembly secured to the vehicle or vehicle wheel assembly.

The conventional configuration for an optical target is precisely engineered with high-contrast optical elements such as circles, squares, or triangles. The accuracy of such conventionally configured optical targets is dependant upon how well the high contrast edges of the optical target elements can be located in an image produced by the imaging components of the wheel alignment system. For the best accuracy, the individual optical elements must be large enough to have relatively long straight or curved boundaries, and they must be separated far enough to prevent the individual optical target elements from appearing to fuse into a single object when reduced edge sharpness causes two or more optical target elements to bleed into the same pixel in the imaging system. These factors combine to limit the number of individual image pixels generated by the imaging system whose values are utilized to calculate a position and orientation of a conventionally configured optical target.

Each image of conventional high-contrast optical target acquired by the optical imaging vehicle wheel alignment system is processed to identify a number of reference points in the image. Either the computer or the imaging system is configured to mathematically manipulate the positional relationships of the observed reference points, as identified in an image, to match them with a set of predetermined positional relationships based on the known parameters of the conventional high-contrast optical target. Once the relationship between the observed positional relationships and the predetermined positional relationships is identified for the reference points, the position and orientation in three-dimensional space of the target (and an associated vehicle wheel) relative to the position and orientation of the imaging system is identified, from which one or more vehicle wheel alignment angles can be identified. Accordingly, for an optical imaging vehicle wheel alignment system to function, it is necessary for the system to be capable of extracting a set of control or reference points from acquired images.

To further facilitate the operation of a machine vision vehicle wheel alignment system, the separate optical targets are secured to the vehicle wheels with precision wheel adaptors configured to clamp onto the vehicle wheel edges and to position a mounting point for the optical target substantially coaxial with the wheel rim's axis of rotation. The traditional precision wheel adaptors typically include a set of claws or feet adapted to secure the wheel adaptor to the vehicle wheel assembly by engaging the lip or rim of the wheel rim at the tire junction. A centering mechanism on the wheel adaptor ensures that the claws or feet of the wheel adaptor are adjusted in a symmetrical manner to maintain the mounting point for the optical target in a determined centered configuration in relation to the axial center of the wheel rim.

Some variations of traditional wheel adaptors, such as the Tire Clamp Adaptor Model No. 20-1789-1 from Hunter Engineering Co., and those shown in U.S. Pat. No. 5,987,761 to Ohnesorge and U.S. Pat. No. 6,131,293 to Maioli et al. further utilize a set of gripping arms adapted to engage tire surfaces in conjunction with a set of contact supports and centering mechanisms for symmetrically engaging the circumferential lip of the wheel rim and securing the wheel adaptors in an axially centered position on the vehicle wheel assembly.

Other vehicle-specific wheel adaptors, such as those for use with Mercedes Benz and BMW automobiles, are configured with a set of pins which are designed to pass through the wheel assembly, and to contact predetermined surfaces on the vehicle wheel hubs, positioning the vehicle-specific wheel adaptor in a predetermined axially centered location about the wheel assembly. These vehicle specific wheel adaptors are then held in place by means of tire clamps or spring mechanisms which grip to the tire tread surfaces.

Traditional wheel adaptors that will universally adapt to the wide range of wheel sizes on the market today are difficult to design and costly to build. Many times additional parts are required, such as extenders, in order to allow the adaptor to work with wheels that are very small or very large which also adds additional cost and complication to the adaptor system. Additionally, traditional adaptors have to provide a substantial amount of clamping force in order to hold the weight of the target or sensor on the wheel assembly. This clamping force can scratch or dent the wheel assembly where it is attached. This is very undesirable especially when the wheel assembly is a very costly aftermarket wheel.

Accordingly, it would be advantageous to provide a machine vision vehicle service system, such as a wheel alignment system, with an optical target assembly which incorporates both the optical target and a simplified adaptor for attachment to a vehicle wheel, and which does not require a determined precision mounting on the vehicle wheel assembly in relation to the wheel axis of rotation.

It would be further advantageous to provide a machine vision vehicle wheel alignment system with a mechanically simplified optical target assembly which is light weight, dimensionally stable, less abrasive to the wheel rim surfaces, and which does not require precision construction.

BRIEF SUMMARY OF THE INVENTION

Briefly stated, the present invention provides a machine vision vehicle wheel alignment system optical target assembly which incorporates an adaptor for attachment of an optical target to a vehicle wheel assembly. The adaptor includes at least one fixed contact point for seating in a non-determined position against surfaces of a vehicle wheel assembly, and a pair of clamping arms configured to grip tread surfaces of a tire mounted to the wheel rim to hold the optical target assembly in contact with the wheel assembly surface. The optical target is secured to the adaptor, and maintained in a stationary relationship to the wheel assembly thereby during a vehicle wheel alignment procedure.

In an alternate embodiment, the present invention provides an improved machine vision vehicle wheel alignment system having a processing unit and at least one imaging sensor for acquiring images of a non-planar target having a plurality of visible features. The non-planar target is removably secured against a vehicle wheel assembly surface, within a field of view of the imaging sensor. A processing unit receives data representative of said visible features from the imaging sensor, and determines at least an axis of rotation of the vehicle wheel utilizing the received data.

The foregoing and other objects, features, and advantages of the invention as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings.

DESCRIPTION OF THE PREFERRED EMBODIMENT

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
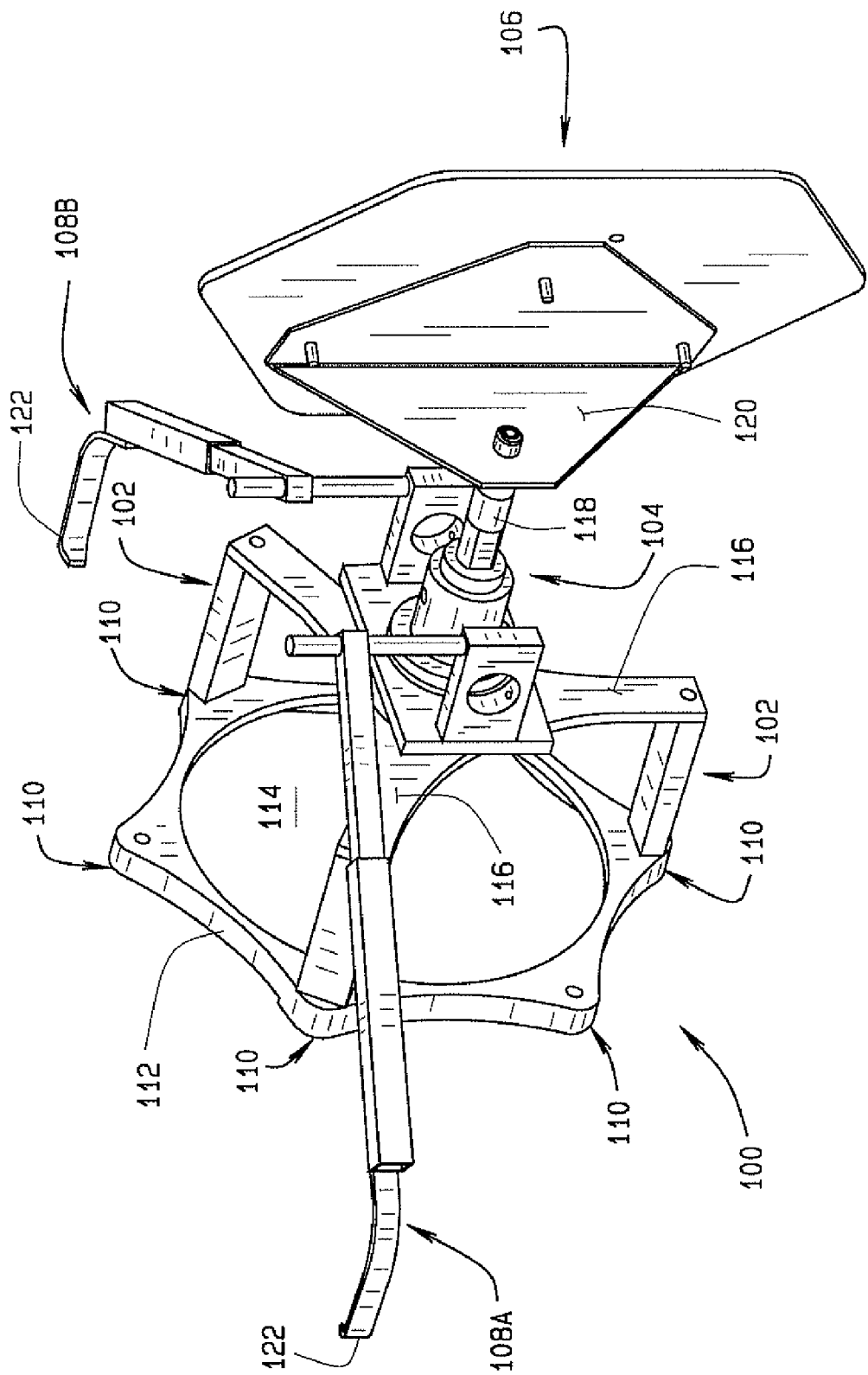
FIG. 1 is a perspective rear view of a first embodiment of the optical target assembly of the present invention.

Turning to FIG. 1, an embodiment of the optical target assembly 100 of the present invention is shown in a rear perspective view. The optical target assembly 100 consists of a simplified or unitary base assembly 102, a pair of opposed wheel clamp arms 108A and 108B coupled to the base assembly, a target support assembly 104 coupled to the base assembly 102, and an optical target 106 secured to the target support assembly.

The simplified or unitary base assembly 102 defines one or more fixed contact surfaces 110 adapted for abutting contact with the generally vertical outer surfaces of a vehicle wheel rim 10 between the outer circumferential lip of the wheel rim and the wheel assembly axis of rotation. The fixed contact surfaces 110 are disposed in a common plane, and as shown in FIG. 1, and are disposed equidistantly about the circumference of an annular member 112, defining a central opening 114 adapted to surround an axial hub-end portion of the vehicle wheel rim 10. A raised support assembly 116 is coaxially secured to the annular member 112 opposite from the fixed contact surfaces 110, extending over the central opening 114 to provide clearance for the hub-end portion of the vehicle wheel rim 10 and to provide support for the various attached components. Since the assembly 102 of the present invention is intended for a non-determined placement against the wheel assembly surface, the assembly 102 does not include any adjustment mechanisms for centering the contact surfaces 110 relative to either the wheel rim circumferential lip or axis of rotation, such as those commonly found in self-centering or adjustable wheel adaptors.

Figure 2:
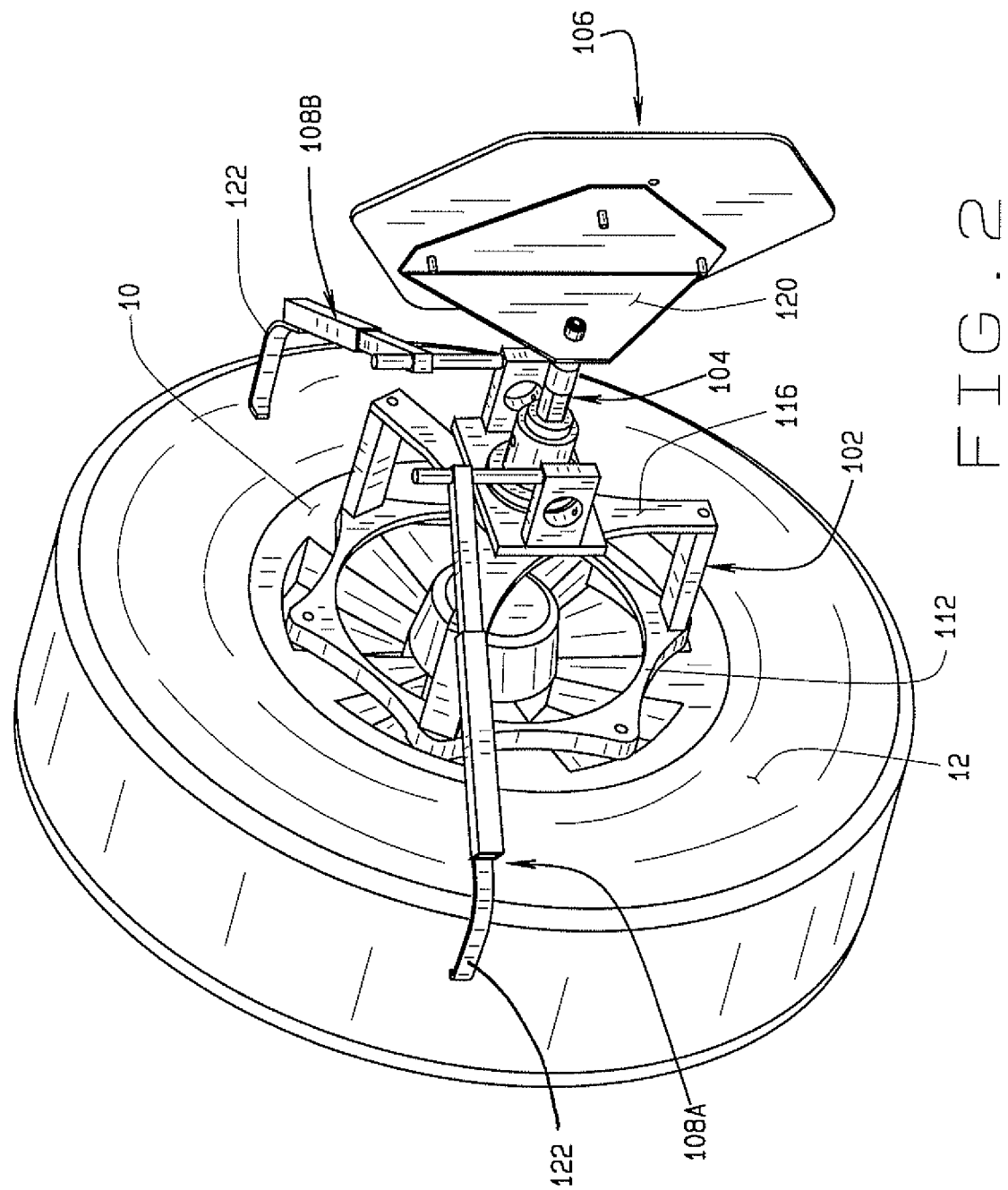
FIG. 2 is perspective rear view of the embodiment of FIG. 1 secured to a vehicle wheel assembly.

To hold the fixed contact surfaces 110 in engagement with a generally vertical surface of a vehicle wheel rim 10, as shown in FIG. 2, a pair of opposed wheel clamp arms 108A and 108B coupled to the support assembly 116 of the base assembly 102. Each wheel clamp arm 108 includes a tire hook 122 disposed on an end opposite from the support assembly 116. The tire hook is configured to grip a tire tread surface of a vehicle wheel 12. Each opposed wheel clamp arm 108 is adjustable to accommodate wheel assemblies of different dimensions.

For example, as shown in FIGS. 1 and 2, the wheel clamp arms 108A and 108B may each be extended or retracted along a longitudinal axis, pivoted about an attachment point to the support assembly 116, or adjusted vertically relative to the attachment point. Those of ordinary skill in the art will recognize that any of a variety of mechanical components may be utilized to achieve the desired range of movement for the wheel clamp arms 108, including, but not limited to, sliding assemblies, threaded assemblies, pivoting assemblies, and expanding assemblies. It is not required that the wheel clamp arms 108 be adjusted synchronously, or that they be disposed in mirror-image configurations, provided the wheel clamp arms 108 are sufficiently positioned to engage the tire tread surfaces of a vehicle wheel to secure the fixed contact surfaces 110 of the base assembly 102 against the surfaces of the wheel rim 10 between the circumferential lip and the axial center point, in a stationary and stable manner during wheel alignment angle measurements and procedures.

Figure 3:
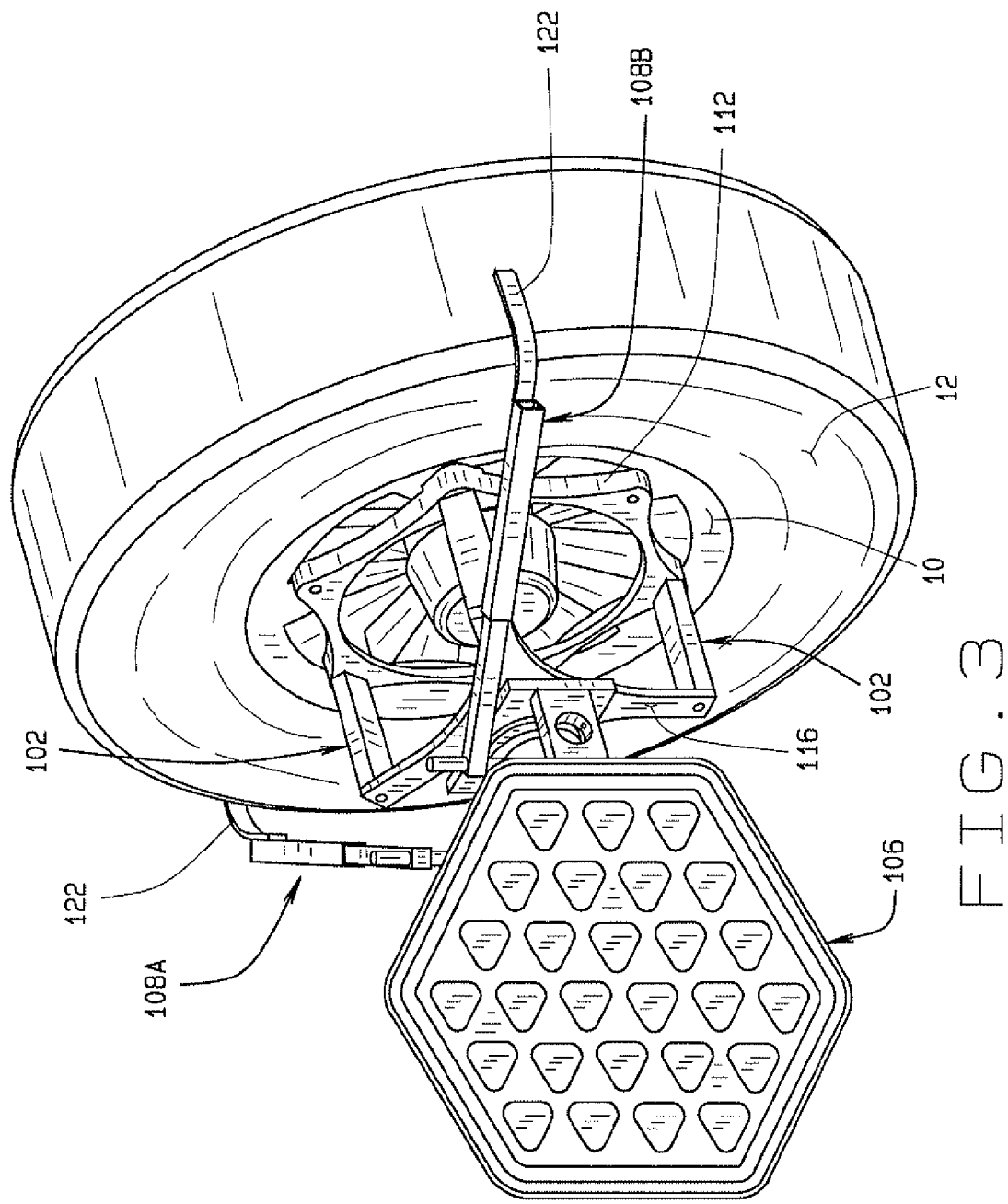
FIG. 3 is a perspective front view of FIG. 2.

As seen in FIGS. 1-3, the target support assembly 104 is coaxially secured to the support assembly 116, and comprises a coaxial target support shaft 118 and a target support flange 120 secured to the target support shaft 118. The target support flange 120 is adjustably coupled to the end of the target support shaft 118, and is configured to support the optical target 106 at an angled orientation relative to the longitudinal axis of the target support shaft 118.

The optical target 106 provides visible features which are identifiable in images acquired by an imaging system associated with a vehicle service device, and which provide a sufficient number of data points to enable a determination as to the position and orientation of the optical target 106 in three-dimensional space from acquired images. For example, the optical target 106 may include a set of geometric figures arranged in a predetermined configuration as shown in U.S. Pat. No. 6,134,792 to January, herein incorporated by reference, or simply a set of identifiable fixed features, such as shown in U.S. Pat. No. 6,894,771 to Dorrance et al., herein incorporated by reference. The visible features (data points) of the optical target 106 need not be disposed on a planar surface, but rather, may be disposed on any dimensionally stable surface or shape, including non-planar surfaces, smoothly curved surfaces, or angled surfaces.

It is less costly to manufacture a target where the identifiable fixed features are not precisely known. U.S. Pat. No. 6,894,771 to Dorrance et al. describes an optimization method that may be employed to precisely determine the location of the features by acquiring multiple images of the target while it is rotated. This method could be used on every alignment that is performed when the vehicle is rolled on the runway surface to determine the axis of rotation, or the method may be performed once as a target calibration procedure where the location of the features are stored and later used via methods outlined by U.S. Pat. No. 6,134,792 to January.

Figure 4:
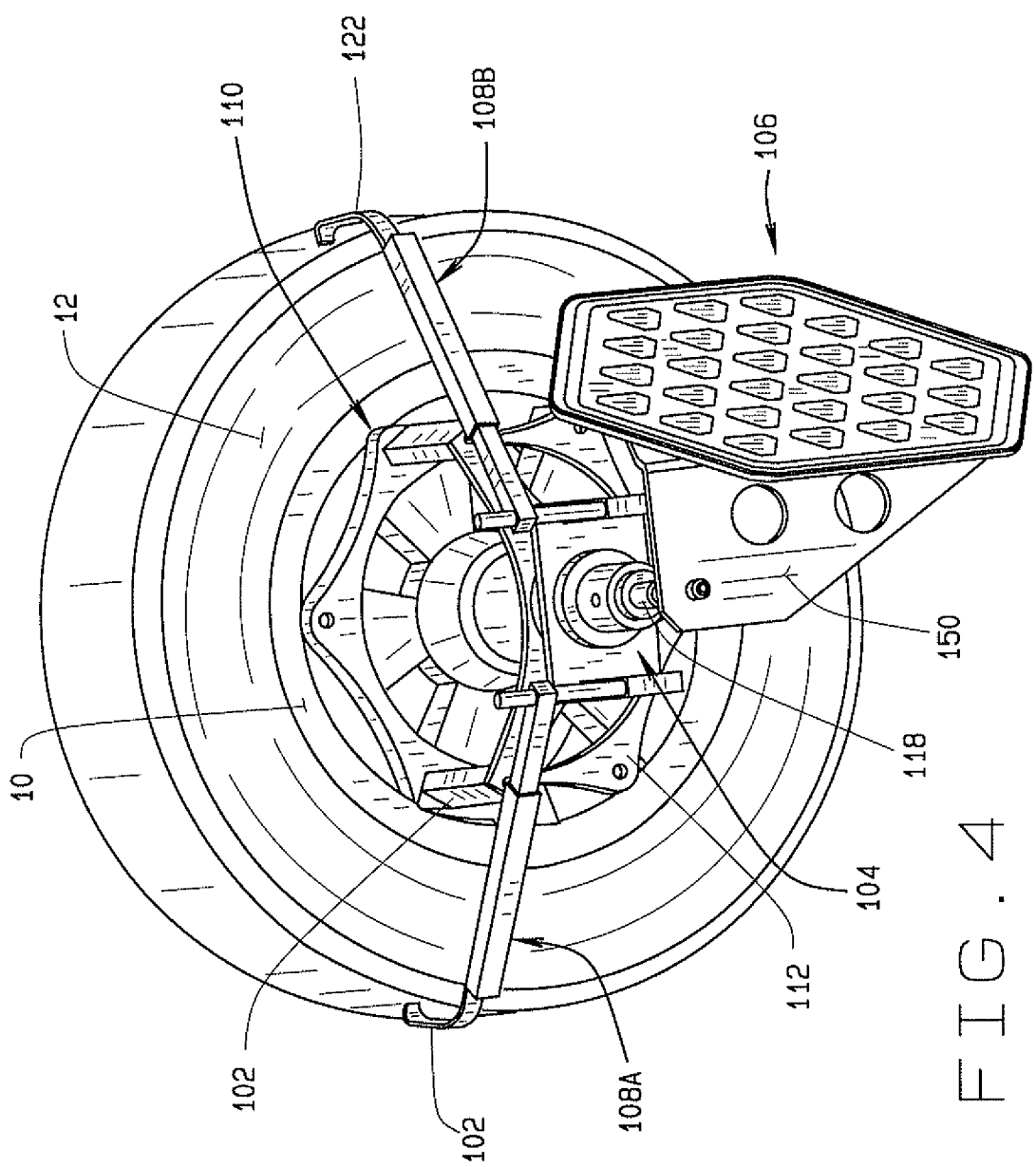
FIG. 4 is a perspective side view of an alternate embodiment of the optical target assembly of the present invention.
Figure 5:
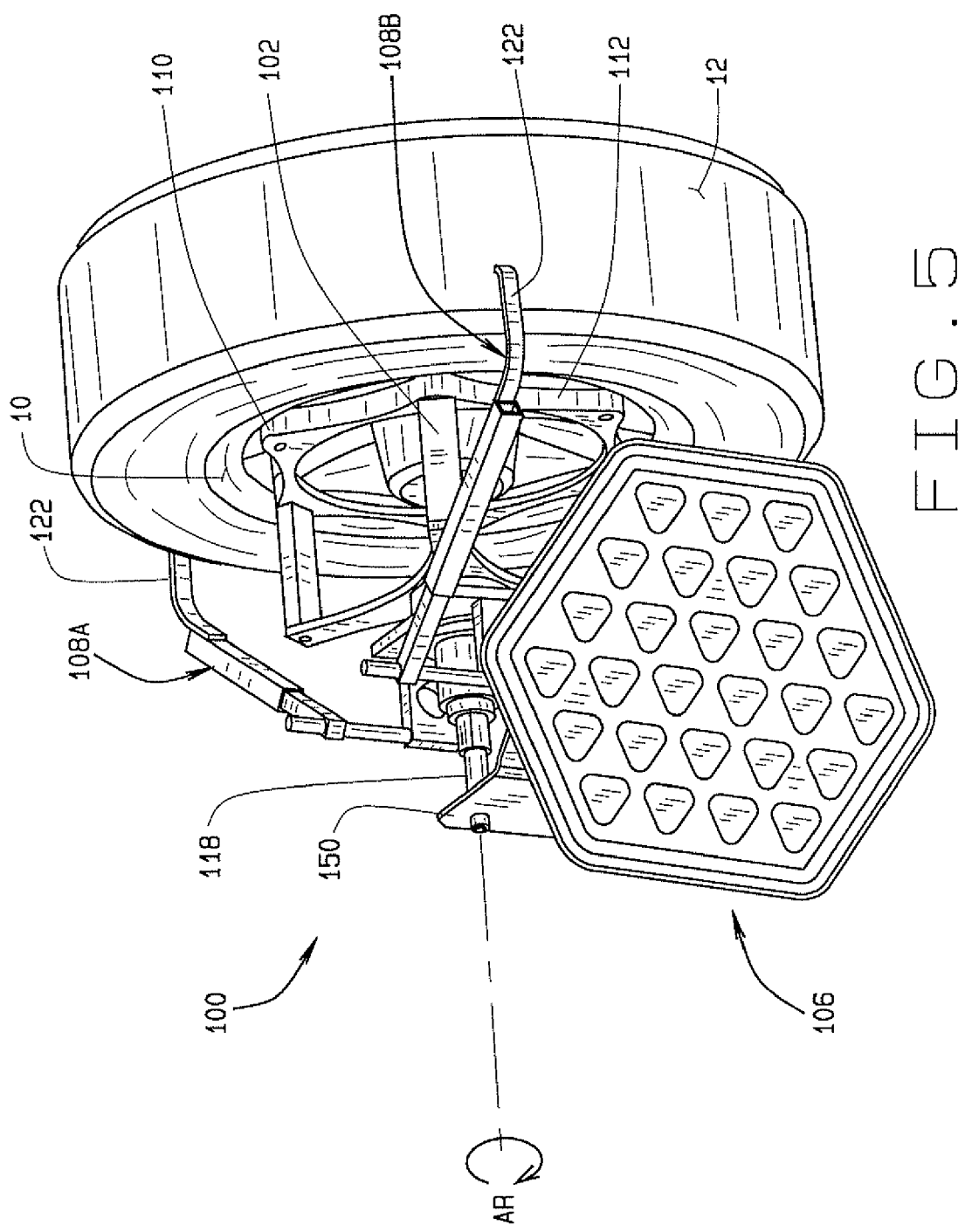
FIG. 5 is a perspective front view of the embodiment shown in FIG. 4.
Figure 6:
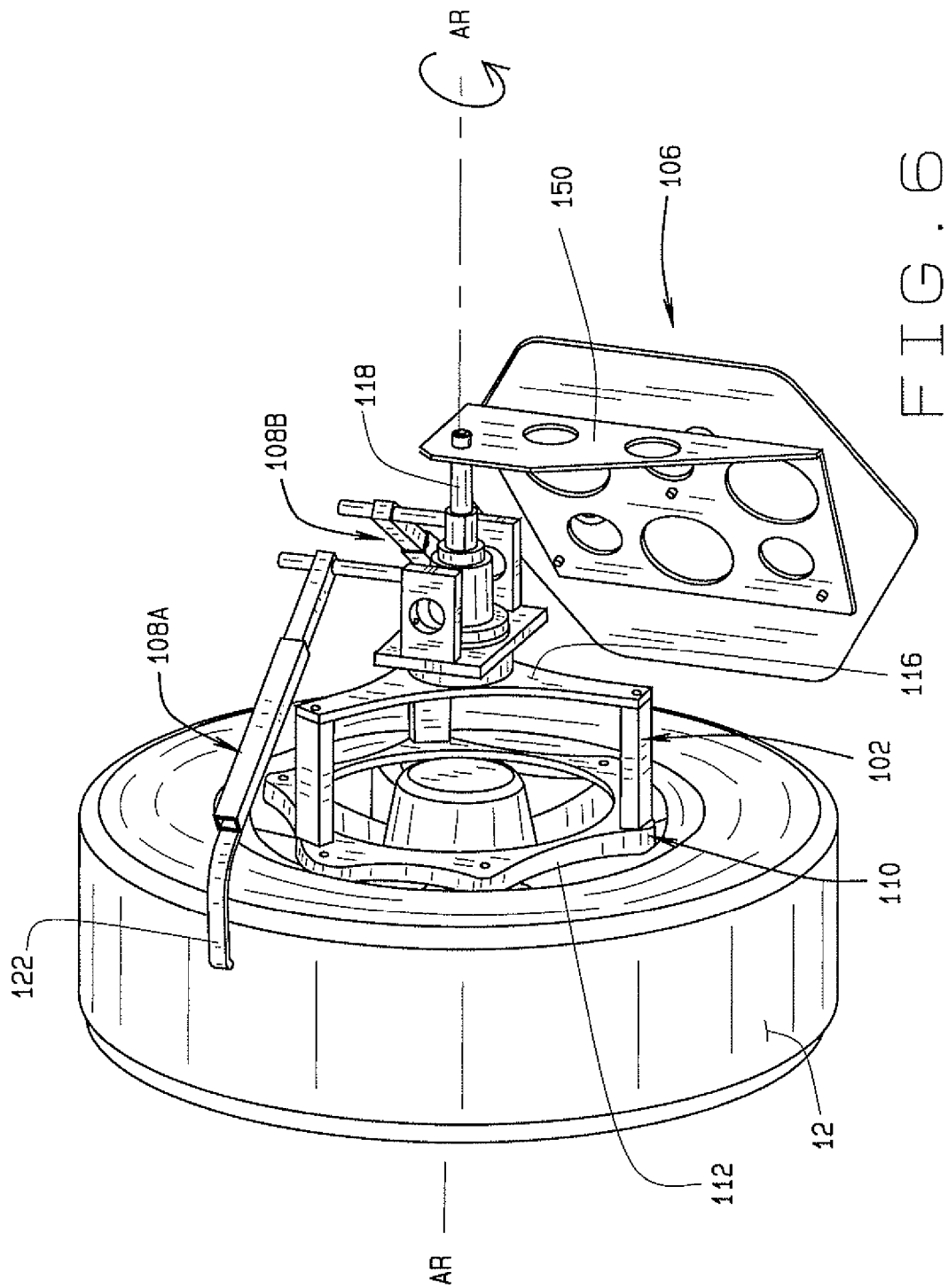
FIG. 6 is a perspective rear view of the embodiment shown in FIG. 4.

In an alternate embodiment of the present invention, shown in FIGS. 4-6, an offset target support flange 150 is adjustably coupled to the end of the target support shaft 118, and is configured to support the optical target 106 at an angled orientation offset relative to the longitudinal axis of the target support shaft 118. Specifically, as is best seen in FIG. 5, the optical target 106 is secured to the offset target support flange 150 and maintained in an outward position from the vehicle wheel assembly which is below, and in-front of, the axis of rotation AR of the vehicle wheel assembly when mounted thereon.

By positioning the optical target 106 in an offset position which is below and in-front of the wheel assembly axis of rotation AR, the optical target 106 remains visible within the field of view of imaging sensors disposed in-front of the vehicle over a wider range of steering movement for the vehicle wheel assembly. As a vehicle wheel assembly is steered in an outward direction about a steering axis, the leading edge of the tire 12 will occlude a line of sight between an imaging sensor disposed in-front of the vehicle and an optical target 106 disposed substantially coaxial with the vehicle wheel assembly axis of rotation AR. To counter-act this effect, coaxially mounted optical targets 106 generally must be disposed sufficiently outward from the surface of the vehicle wheel assembly so as to remain visible throughout the desired range of steering angles. As the optical target mounting is moved outward from the surface of the vehicle wheel rim 10, the weight of the optical target 106 acts on the various target support assemblies 100 over a greater distance, requiring a corresponding increase in attachment strength to maintain the optical target 106 in a secured position against the vehicle wheel assembly. Accordingly, by disposing the optical target 106 below and in-front of the vehicle wheel axis of rotation AR, the leading edge of the tire 12 does not occlude as much of the optical target surface during a steering movement, and corresponding, the optical target 106 does not have to be disposed as far outward from the vehicle wheel rim surface 10 as an on-axis optical target would be, resulting in a reduction in the attachment strength required to maintain the offset optical target 106 in a secure position against the vehicle wheel assembly surface.

Those of ordinary skill in the art will recognize that the specific positioning of the optical target 106 off of the vehicle wheel assembly axis of rotation AR may vary, depending upon the particular configuration of the vehicle wheel assembly, adjacent vehicle body components, and the placement of the imaging sensors disposed to view the optical target 106. Accordingly, it is intended that any of a variety of optical target support assemblies, having different configurations and attachment components for maintaining an optical target 106 in a secure position and orientation relative to a vehicle wheel assembly surface may be utilized within the scope of the invention.

Figure 7:
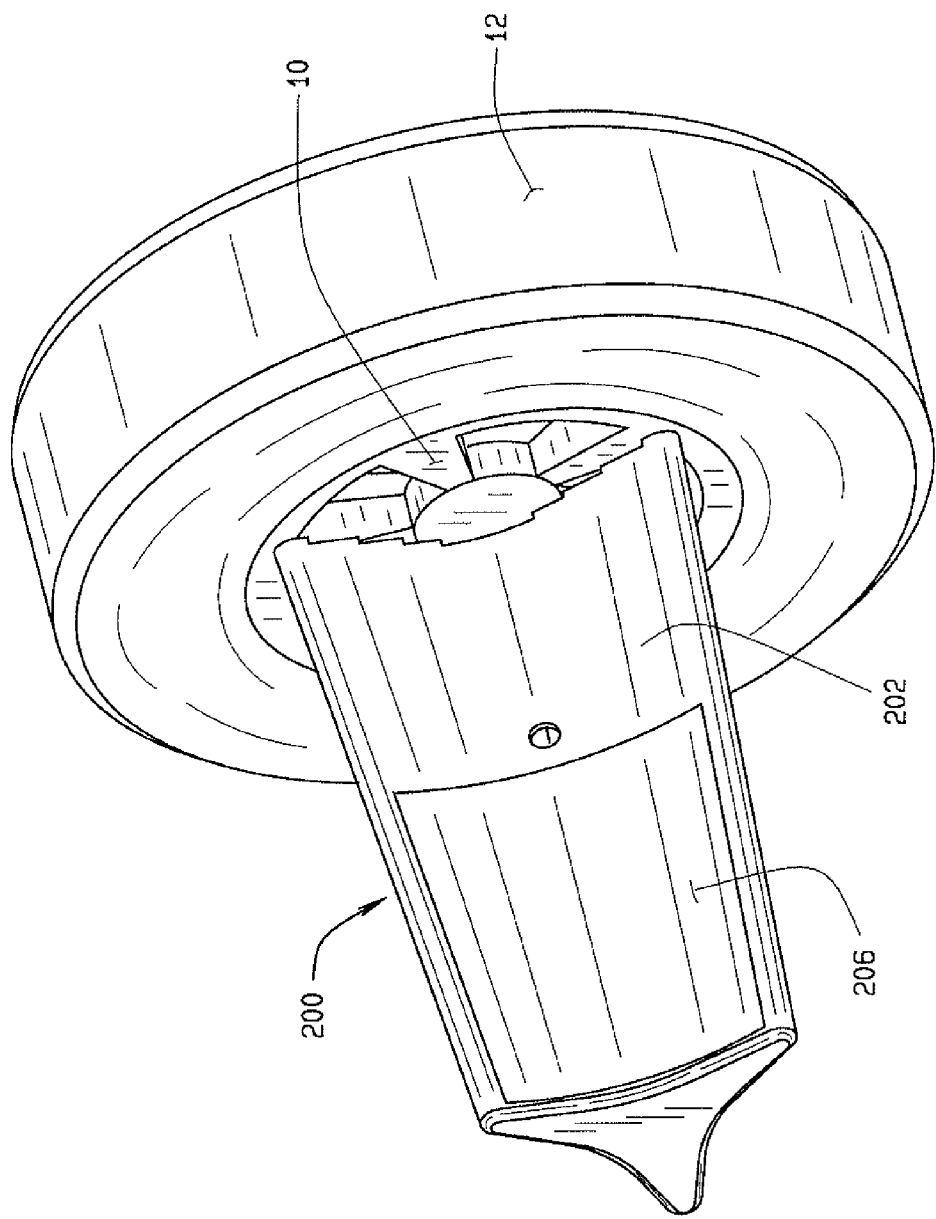
FIG. 7 is a perspective front view of a second alternate embodiment of the optical target assembly of the present invention.

For example, turning to FIG. 7, an alternate embodiment of the optical target support assembly is shown generally at 200. The optical target support assembly 200 is of unitary construction, incorporating an optical target 206 directly onto an exterior surface of the support assembly 200, opposite from one or more fixed contact surfaces 210. As shown in FIG. 7, the optical target support assembly 200 is generally coaxial with the vehicle wheel axis or rotation AR, but those of ordinary skill in the art will recognize that the optical target support assembly 200 may be varied in shape, size, and configuration to position the incorporated optical target 206 into a surface of the support assembly 200 at other desired positions and orientations relative to a vehicle wheel axis of rotation, such as previously described. A base 202 of the support assembly defines the fixed contact surfaces 210 adapted to contact a generally vertical outer surface of a vehicle wheel rim 10 between the circumferential lip of the wheel rim and the axis of rotation AR. The contact surfaces 210 are disposed in a common plane, and as shown in FIG. 4, are disposed equidistantly about the circumference of the base 202, adapted to surround an axial hub-end portion of the vehicle wheel rim 10. Preferably, the body is formed from a molded plastic or other lightweight material.

Any of a variety of mechanisms may be utilized to hold the optical target support assembly 200 against the surface of a vehicle wheel assembly during use, provided the target support assembly 200 is maintained in a fixed position against the surface of the vehicle wheel assembly. For example, wheel clamp arms (not shown) may be utilized in substantially the same manner as previously described to grip the tread surface of the vehicle wheel tire 12, or flexible "bungee" style elastic cords may be utilized to "pull" the optical target support assembly against the face surfaces of the vehicle wheel rim 10. Similarly, removable adhesives or magnets of sufficient strength to support the optical target support assembly 200 may be utilized on suitable surfaces.

During use, an optical target support assembly of the present invention, such as shown at 100 or 200, is positioned against a generally vertical outer surface of a vehicle wheel rim 10, such that the visible features of the optical target 106, 206 associated with the support assembly are orientated for viewing by one or more imaging sensors. The specific placement of the support assembly against the outer surface of the wheel rim 10 need not be coaxial with the wheel assembly, i.e., may be eccentric with the vehicle wheel assembly, but must be sufficiently stable to prevent the optical target from tilting, wobbling, or slipping from the initial position during a vehicle service procedure. To maintain the optical target support assembly in a stable position against the wheel rim surface, suitable support mechanisms, such as the wheel clamp arms shown in FIGS. 2 and 3, are adjusted to grip tread surfaces of the vehicle tire 12, preferably above a horizontal plane through which the wheel axis of rotation AR passes. The interaction of gravity, the optical target support mechanisms, and the fixed contact surfaces of the optical target support assembly interact to maintain the fixed contact surfaces against the wheel rim surface, and to hold the optical target 106, 206 in a stable position during a vehicle service procedure and through a limited range of wheel assembly movement.

Since the optical target 106, 206 disposed on the optical target support assembly is not secured to the vehicle wheel assembly in any predetermined position, e.g., concentric with the wheel axis of rotation AR, it is necessary to determine the wheel axis of rotation AR for purposes of calculating vehicle wheel alignment angle measurements from images of the optical targets 106, 206. It is also desirable to compute the wheel assembly center point to further increase accuracy of the alignment measurements. Methods to determine the axis of rotation and center point are described in the co-pending U.S. patent application Ser. No. 11/013,057, herein incorporated by reference.

For example, a three-dimensional direction vector corresponding to a wheel assembly's axis of rotation AR and a point corresponding to the wheel assembly center point CP can be estimated from two or more optical target location "snapshots", taken as the wheel assembly is rotated partially about the axis of rotation AR. Mathematical techniques may be used to obtain a direction vector from the optical target location and attitude information contained in two or more snapshots. The acquired sequence of images is utilized to identify an actual intersection point IP between the axis of rotation AR of the vehicle wheel assembly and the surface of the optical target 106, 206 as a point on the optical target surface having the least amount of linear deviation in the sequence of images.

Figure 8:
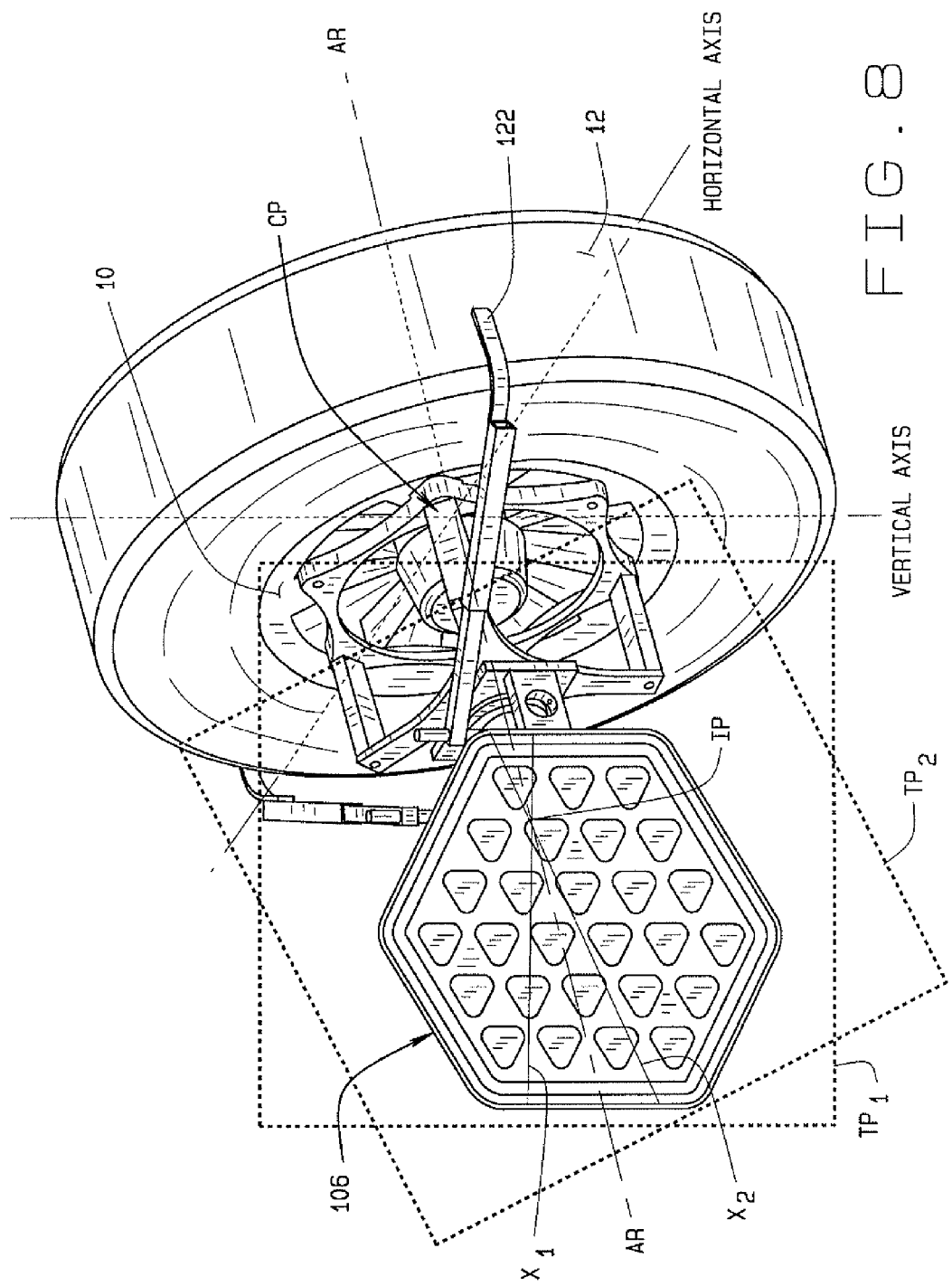
FIG. 8 is a perspective illustration of an optical target assembly of FIG. 1 mounted to a vehicle wheel, rotated between two positions about an axis of rotation.
Figure 9:
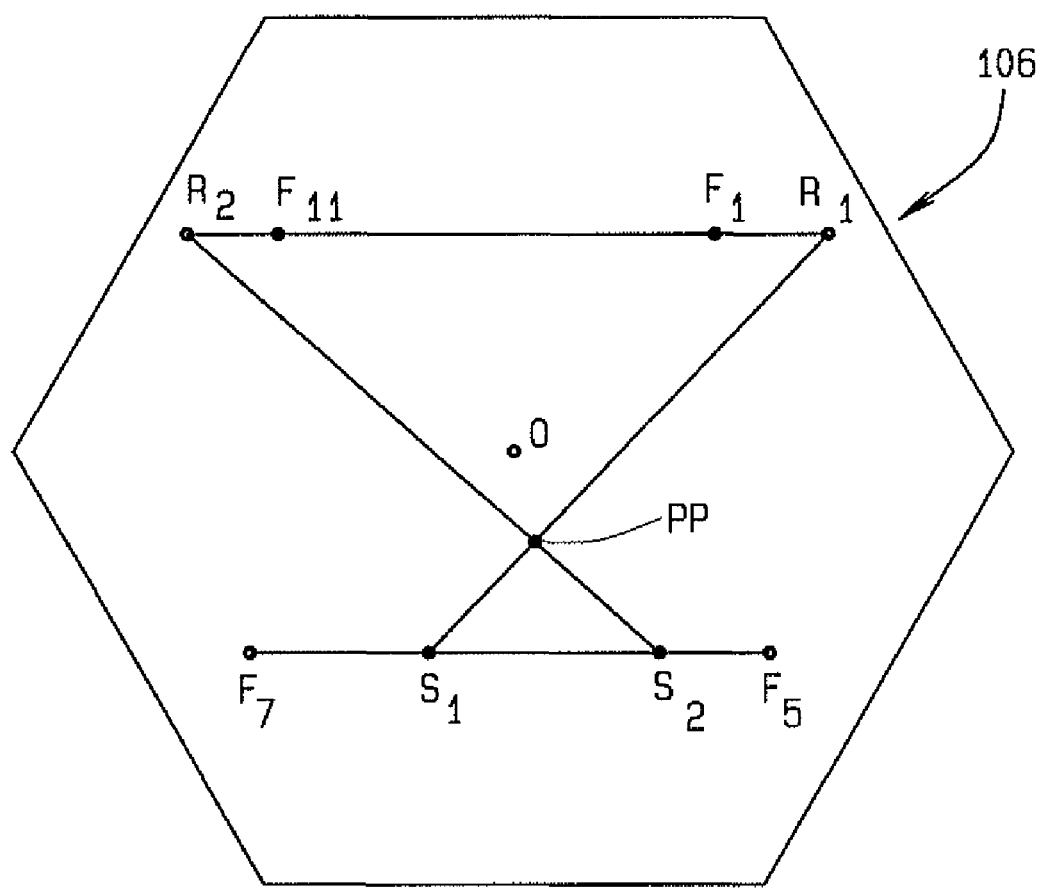
FIG. 9 is a simplified representation of reference points and associated interrelationships on an optical target face.

A reference point, such as the wheel center point CP may be established for a vehicle wheel using an optical target 106, 206 operatively coupled to the vehicle wheel in a predetermined relationship, such as shown in FIG. 8. Two or more images of the wheel-mounted optical target are acquired at different rotational positions of the vehicle wheel, and a position and orientation of the wheel-mounted optical target is determined in a three-dimensional coordinated system from the acquired images.

The three-dimensional direction vector corresponding to a wheel's axis of rotation AR can also be estimated from two or more optical target location "snapshots", taken as the wheel assembly is rotated about the axis of rotation AR. Mathematical techniques may be used to obtain a direction vector from the target location and attitude information contained in two or more snapshots. Although direction information can be obtained, specific points in space which are known to lie on the wheel's axis-of-rotation AR are not identified.

Using the predetermined relationship between the wheel-mounted optical target with the vehicle wheel, and the predetermined configuration of the optical target, an intersection point IP is identified in the three-dimensional coordinate system between an axis of rotation AR of the vehicle wheel and an observed surface of the optical target. This intersection point IP is referred to as the "nominal piercing point". Assuming that the actual configuration of the wheel and the optical target conforms with the predetermined configurations thereof, the predetermined configuration of the wheel-mounted optical target and the intersection point IP are utilized to identify a point on the axis of rotation AR which is displaced from the optical target surface by a predetermined distance, based on the known configuration of the optical target and vehicle wheel. The identified point corresponds to the wheel center point CP of the vehicle wheel.

Alternatively, a wheel center point CP for a vehicle wheel may be determined from a sequence of images of an optical target operatively coupled to the vehicle wheel. The vehicle wheel is rotated about the axis of rotation AR while a sequence of at least two images of the wheel-mounted optical target is acquired. The acquired sequence of images is utilized by the vehicle wheel alignment system to identify an actual intersection point IP between the axis of rotation AR of the vehicle wheel and the face of the optical target as a point on the optical target surface having the least amount of linear deviation in the sequence of images.

Those of ordinary skill in the art will recognize that several methods may be utilized to identify the actual intersection point IP on the target surface, for example, a non-linear optimization technique such as the Levenberg-Marquardt algorithm may be employed to solve an over-determined system of simultaneous equations to identify the point on the optical target surface having the least amount of linear movement between two or more sequential images. However, non-linear optimization techniques are preferably utilized in situations where the wheel assembly is permitted to roll in a linear direction and a series of images of the optical target surface are captured. It is assumed that the axis of rotation AR of the wheel assembly will continue to point in the same direction in each of the images.

Alternatively, planes TP1 and TP2 which are defined by the features on the optical target surface are identified in each image of the optical target 106, 206 at two different rotational positions of the vehicle wheel assembly, without requiring translational movement of the vehicle wheel assembly, i.e. when a vehicle is jacked up above a supporting surface and the wheel assembly is not resting on the surface during rotation. An equation representative of a line of intersection between each of the two planes TP1 and TP2 is determined in a coordinate system based on the first plane TP1, and next in a coordinate system based on the second plane TP2. There are therefore two separate planar lines X1 and X2 determined in the two separate planar coordinate systems and only one line AR determined by the intersection of the two planes TP1 and TP2 in a three dimensional coordinate system. The single point of intersection of the two lines X1 and X2 in a common coordinate system, preferably the coordinate system of the optical target surface, represents the actual intersection point IP between the axis of rotation AR of the wheel assembly and the optical target surface.

The actual intersection point IP, together with the configuration of the optical target are utilized to identify a point on the axis of rotation AR displaced from the target surface, corresponding to the wheel center point CP for the vehicle wheel assembly. With reference to FIG. 6, the method for determining the actual intersection point IP using intersecting lines is described in more detail. An optical target surface coordinate system is initially established based on visible features F of the optical target 106, 206. Precise coordinates are predetermined for all the features F on the optical target surface. The origin of the optical target surface coordinates is based on a feature (real or determined) at the center of the array of visible features F. Four feature points F1, F5, F7, and F11 around the periphery of the optical target surface are used in the method. These four outer features F of the optical target surface are selected to each lie at the same radius from the target origin O. Although many sets of four features F could be employed, the preferred method uses features arrayed around the optical target surface in a manner analogous to particular hours on a clock face. Feature F1 corresponds to one o'clock, feature F5 corresponds to five o'clock, feature F7 corresponds to seven o'clock and feature F11 corresponds to eleven o'clock.

The optical target is generally positioned relative to the vehicle wheel assembly by the optical target support assembly 102, 202 such that the axis-of-rotation AR is not normal and not parallel to the optical target surface. There are four coordinate systems involved in the method, an imaging system or camera coordinate system that identifies the position and attitude of objects relative to the imaging system or camera measurement sensors of a vehicle service system, an optical target surface coordinate system that identifies the location of optical target features relative to the center of the pattern on the optical target surface, and are two snapshot coordinate systems, Snap1 and Snap2.

The Snap1 coordinate system is such, that any point in space is assigned coordinates that match the optical target surface coordinates the point would have when the optical target surface is aligned with the first image snapshot position. Analogously, the Snap2 coordinate system matches optical target surface coordinates when the optical target surface is aligned with the second image snapshot position.

An instantaneous coordinate transform between optical target coordinates and camera coordinates is computed. Therefore, the two image snapshots facilitate computation of coordinate transforms between all four of the above-mentioned coordinate systems.

Initially, the Snap1 coordinates of features F11 and F1 are obtained. These will be the same as the optical target surface coordinates of those features, according to the precise design model of the optical target. The coordinates of these features are transformed into Snap2 coordinates. Both points will probably be outside the Snap2 optical target face plane (which would have a z coordinate of zero). A line is defined between the two points and the point R where that line intersects the Snap2 optical target face plane is identified. Point R lies in both snapshot planes. The set of coordinates that describe point R in Snap1 coordinates is designated R1, and the set of coordinates that describe point R in Snap2 coordinates is designated R2. Because R2 lies in the second snapshot optical target face plane, the z-coordinate of R2 is zero.

The known transform between the coordinate systems is applied to find the coordinates of point R in Snap1 coordinates, i.e. R1. Because R1 lies in the first snapshot optical target face plane, the z-coordinate of R1 is zero.

Next, the Snap1 coordinates of where features F7 and F5 appeared during the first snapshot are obtained. These will be the same as the optical target coordinates of those features, according to the model of the optical target. The two points are transformed into Snap2 coordinates. Both points may be outside the Snap2 optical target face plane (which would have a z coordinate of zero). A line is formed between the two points and the point where that line intersects the Snap2 optical target face plane is identified. The intersection in space will be called point S, and lies in both snapshot planes. Together, points R and S define the line in space where the two snapshot planes intersect. The set of coordinates that describe point S in Snap2 coordinates will be called S2. Because S2 lies in the second snapshot target face plane, the z-coordinate of S2 is zero.

The known transform between coordinate systems is again applied to find the coordinates of point S in Snap1 coordinates. These coordinates will be referred to as S1. Because S1 lies in the first snapshot optical target face plane, the z-coordinate of S1 is zero.

Next, R1, R2, S1 and S2 are identified on the same two-dimensional grid of target coordinates. All four have a z-coordinate of zero, so they may be treated as X-Y coordinate pairs. The equation of the line joining the coordinate pairs R1 and S1 is identified. This line represents the set of Snap1 coordinates for all points that lie on both snapshot planes. Next, the equation of the line that joins the coordinate pairs R2 and S2 is identified, representing the set of Snap2 coordinates for all points that lie on both snapshot planes. Solving these two line equations simultaneously yields the X and Y optical target surface coordinates of the actual piercing point PP through which the axis of rotation of the vehicle wheel passes through the optical target surface.

The present invention can be embodied in part in the form of computer-implemented processes and apparatuses for practicing those processes. The present invention can also be embodied in part in the form of computer program code containing instructions embodied in tangible media, such as floppy diskettes, CD-ROMs, hard drives, or an other computer readable storage medium, wherein, when the computer program code is loaded into, and executed by, an electronic device such as a computer, micro-processor or logic circuit, the device becomes an apparatus for practicing the invention.

The present invention can also be embodied in part in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented in a general-purpose microprocessor, the computer program code segments configure the microprocessor to create specific logic circuits.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A method for securing an optical target in a non-determined placement relative to a vehicle wheel assembly consisting of a wheel rim and a tire mounted thereon, comprising:
    abutting a base of said optical target against an outer surface of the vehicle wheel assembly in a non-determined placement between a circumferential lip of the wheel rim and an axial center point of the wheel rim;

orienting said optical target such that at least two surfaces, each having a plurality of target elements arranged thereon in geometric and spatial configurations relative to each other, are within a field of view of at least one imaging sensor;

coupling at least one attachment mechanism between said base and said vehicle wheel assembly to maintain said base in an immobile position against said outer surface of the wheel assembly during a vehicle service procedure.

2. The method of claim 1 wherein said at least two surfaces are non-planar surfaces.

3. The method of claim 1 wherein said at least two surfaces are smoothly curved surfaces.

4. The method of claim 1 wherein said at least two surfaces are angled surfaces.

5. The method of claim 1 wherein said at least two surfaces are dimensionally stable.

6. The method of claim 1 wherein said at least two surfaces are facets of a dimensionally stable object.

7. The method of claim 1 further including the step of calibrating the optical target by evaluating images of said plurality of target elements to identify said geometric and spatial configurations.

8. The method of claim 1 wherein one of said at least two surfaces is disposed within said field of view at a position which is both below, and in front of, an axis of rotation of the vehicle wheel assembly.

9. An optical target support assembly for use with a vehicle wheel alignment system, comprising:

a base configured for non-determined abutting placement against an outer surface of a vehicle wheel assembly between the circumferential lip of a wheel rim and an axial center point of said wheel rim;

an optical target secured to said base in a non-determined relation to the wheel rim, said optical target having at least two surfaces on which are disposed a plurality of visible target elements in a geometric and spatial configuration; and at least one attachment mechanism configured to maintain said base in contact with, and immobile relative to, said outer surface of the wheel assembly during a vehicle service procedure.

10. The optical target support assembly of claim 9 wherein said optical target is secured to said base in a position in which at least one of said surfaces is both below a horizontal plane defined by an axis of rotation of said wheel assembly and in front of a vertical plane defined by said axis of rotation of said wheel assembly when said base is disposed in said non-determined abutting placement against the outer surface of the vehicle wheel assembly.

11. A machine vision vehicle wheel alignment system for acquiring measurements associated with a vehicle, comprising:

at least one imaging sensor having a field of view;

at least one optical target secured to the vehicle within the field of view of said at least one imaging sensor, said optical target having a plurality of visible target elements disposed on at least two surfaces in a determinable geometric and spatial configuration;

a processing unit configured to receive image data representative of at least one visible target element on each of said two surfaces from said at least one imaging sensor, and to process said received image data to together with said determinable geometric and spatial configuration of said plurality of visible target elements, to determine at least one measurement associated with said vehicle.

12. The machine vision vehicle wheel alignment system of claim 11 wherein said at least two surfaces are non-planar surfaces.

13. The machine vision vehicle wheel alignment system of claim 11 wherein said at least two surfaces are smoothly curved surfaces.

14. The machine vision vehicle wheel alignment system of claim 11 wherein said at least two surfaces are angled surfaces.

15. The machine vision vehicle wheel alignment system of claim 11 wherein said at least two surfaces are dimensionally stable.

16. The machine vision vehicle wheel alignment system of claim 11 wherein said at least two surfaces are facets of a dimensionally stable object.

17. The machine vision vehicle wheel alignment system of claim 11 wherein one of said at least two surfaces of said optical target secured within said field of view is positioned both below, and in front of, an axis of rotation of the vehicle wheel assembly.

18. A machine vision vehicle wheel alignment system for acquiring measurements associated with a vehicle, comprising:

at least one imaging sensor having a field of view;

at least one optical target secured to the vehicle within the field of view of said at least one imaging sensor, said optical target having a first target element disposed on a first surface visible to said imaging sensor, and a second target element disposed on a second surface visible to said imaging sensor, said first and second surfaces being non-coplanar, and wherein said first and second target elements are in a determinable geometric and spatial configuration relative to each other;

a processing unit configured to receive image data representative of each of said target elements from said at least one imaging sensor, and to process said received image data to together with said determinable geometric and spatial configuration of said target elements, to determine at least one measurement associated with said vehicle.

19. A method for securing an optical target relative to a vehicle wheel assembly consisting of a wheel rim and a tire mounted thereon, comprising:

securing a target support assembly to said vehicle wheel assembly to maintain said target support assembly in an immobile position against said outer surface of the wheel assembly during a vehicle service procedure;

coupling an optical target to said target support assembly at a position which is both below, and in front of, an axis of rotation of the vehicle wheel assembly; and orienting said optical target such that at least one surface, having a plurality of target elements arranged thereon in geometric and spatial configurations relative to each other, is within a field of view of at least one imaging sensor.

* * * * *